United States Patent [19]

Aiba

[11] 4,392,542
[45] Jul. 12, 1983

[54] DEVICE FOR PREVENTING DISPLACEMENT OF AN ENGINE IN A MOTORCYCLE

[75] Inventor: Yasuaki Aiba, Sakado, Japan

[73] Assignee: Honda Giken Kogyo Kabushiki Kaisha, Tokyo, Japan

[21] Appl. No.: 337,554

[22] Filed: Jan. 6, 1982

[30] Foreign Application Priority Data

Jan. 9, 1981 [JP] Japan .............................. 56/1488[U]

[51] Int. Cl.³ .......................... B60K 11/04; B60K 5/12
[52] U.S. Cl. ..................................... 180/228; 248/544
[58] Field of Search ............... 180/228, 227, 219, 297, 180/312, 300; 248/573, 574, 544; 267/141.3, 141.4, 141.5, 141.7

[56] References Cited

U.S. PATENT DOCUMENTS 3,542,146 11/1970 Hooper ................................ 180/228

*Primary Examiner*—Joseph F. Peters, Jr.
*Assistant Examiner*—Donn McGiehan
*Attorney, Agent, or Firm*—Sughrue, Mion, Zinn, Macpeak and Seas

[57] ABSTRACT

A device for preventing displacement of an engine in a motorcycle when a driving chain which transmits the rotation of the engine to a rear wheel has created a counteraction on the engine when the motorcycle is started. The device comprises a rigid tubular member fitted about each end portion of each bolt mounting the engine on a body frame, and a generally cylindrical anti-vibratory rubber member encircling the tubular member, and secured thereto. The tubular member terminates at one end in a flange defining a pair of stops which can abut on the peripheral surface of a hole formed in the engine and through which the bolt extends.

8 Claims, 5 Drawing Figures

DEVICE FOR PREVENTING DISPLACEMENT OF AN ENGINE IN A MOTORCYCLE

BACKGROUND OF THE INVENTION

This invention relates to a device for preventing displacement of an engine in a motorcycle.

Generally, an engine of a motorcycle is mounted on a body frame of the motorcycle through rubber members for dampering purpose. A number of brackets are attached to the frame, and a mounting bolt extends horizontally through each brackets along transverse direction of the motorcycle. A generally cylindrical anti-vibratory rubber member encircles each end of each mounting bolt. The engine is provided with a plurality of mounting holes each receiving therein one anti-vibratory rubber member of one mounting bolt, whereby the engine is mounted on the frame in an anti-vibratory fashion.

The rotation of the engine is transmitted by a driving chain from a sprocket on its output shaft to a sprocket on the axle of a rear wheel. When the motorcycle is started, however, the driving force of the chain creates a counteraction which pulls the engine backward. The displacement of the engine causes excessive compression and deformation of the rubber members, and their gradual fatigue with a resultant loss of their anti-vibratory function. It also causes sagging of the driving chain, and the chain is likely to have a shortened service life.

SUMMARY OF THE INVENTION

It is an object of this invention to eliminate the aforesaid problems in the prior art, and provide a device which is simple in construction, and can effectively prevent any such displacement of an engine in a motorcycle. According to this invention, there is provided a device which essentially comprises a rigid tubular member fitted about each bolt mounting an engine on a body frame adjacent to each end thereof, and a generally cylindrical anti-vibratory rubber member encircling the rigid tubular member. The inner rigid tubular member is provided at one end with a flange which defines a pair of stops adapted to prevent displacement of the engine when the driving force of a driving chain has created a counteraction on the engine.

DETAILED DESCRIPTION OF THE INVENTION

Figure 1:
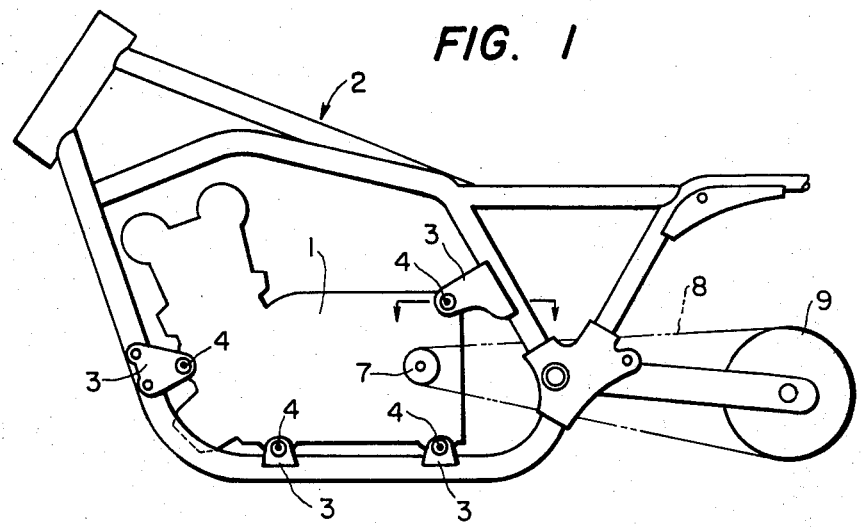
FIG. 1 is a side elevational view showing schematically an engine mounted on the body frame of a motorcycle.

Referring first to FIG. 1 of the drawings, there is schematically shown an engine 1 mounted on the body frame 2 of a motorcycle. A number of brackets 3 are attached to the frame 2, and a mounting bolt 4 extends horizontally through each bracket 3. The output of the engine 1 is transmitted by a driving chain 8 from a sprocket 7 on its output shaft to a sprocket 9 on the axle of a rear wheel.

Figure 3A:
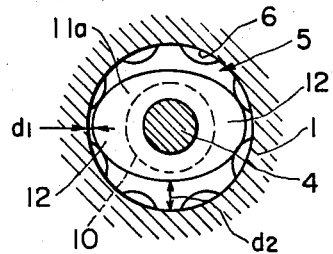
FIG. 3(a) is a sectional view taken along the line III—III of FIG. 2.
Figure 3B:
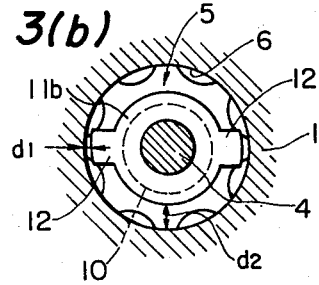
FIGS. 3(b) and 3(c) are views similar to FIG. 3(a), but showing modified forms of the device according to this invention.
Figure 3C:
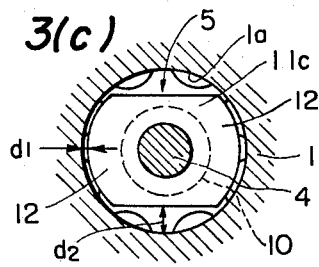
Figure 2:
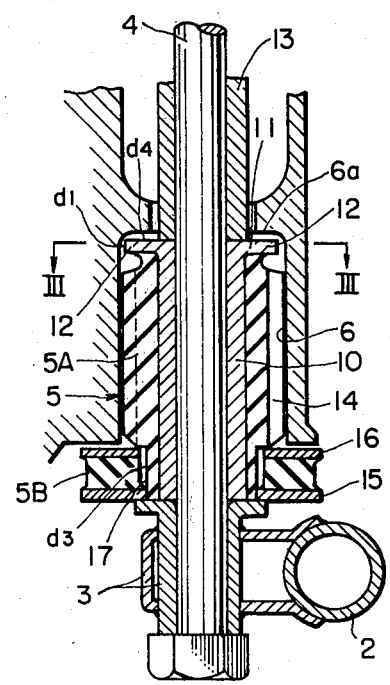
FIG. 2 is a horizontal sectional view of a device embodying this invention.

Referring now to FIG. 2, there is shown a device embodying this invention. The engine 1 is provided with a plurality of mounting holes 6, and one device according to this invention is provided in each hole 6. The device essentially comprises a rigid tubular member 10 fitted about the mounting bolt 4 adjacent to each end thereof, and a generally cylindrical anti-vibratory rubber member 5 surrounding the rigid tubular member 10. The inner rigid tubular member 10 is provided at one end with a flange 11 which defines a pair of stops 12. The flange 11 extends longitudinally of the motorcycle, and defines the stops 12 which also extend longitudinally thereof. The flange and the stops may be designed in a variety of forms as shown in FIGS. 3(a) to 3(c) by way of example. FIG. 3(a) shows an oval flange 11a, and a pair of generally crescent stops 12. FIG. 3(b) shows a circular flange 11b, and a pair of diametrically opposite, substantially rectangular stops 12 projecting from the flange 11b. FIG. 3(c) shows partly circular flange 11c having a pair of arcuate edges which define a pair of stops 12.

The flange and the stops are spaced somewhat inwardly apart from the peripheral surface of the hole 6. Each stop 12 and the peripheral surface of the hole 6 have a horizontal spacing $d_1$ therebetween which is smaller than the vertical spacing $d_2$ between the flange 11a, 11b or 11c, and the peripheral surface of the hole 6, so that when the driving force of the chain has created a counteraction on the engine 1, the peripheral surface of the hole 6 may immediately abut on the stops 12, and the stops 12 may prevent any further displacement of the engine. The vertical spacings $d_2$ allow for normal vibration of the engine 1, and in the event any greater vibration has occurred, the flange 11 abuts on the peripheral surface of the hole 6 to prevent any excessive compression of the rubber member 5.

A pair of devices according to this invention are provided for each mounting bolt 4 adjacent to the opposite ends thereof. A tubular spacer 13 encircles the mounting bolt 4 between the two devices of this invention to hold them in position, as is obvious from FIG. 2.

Each rubber member 5 comprises a cylindrical portion 5A which is adapted to absorb the vertical or longitudinal vibration of the engine 1, and a flange portion 5B adapted to absorb its transverse vibration. FIG. 2 shows the cylindrical and flange portions 5A and 5B which are separate from each other, but it is also possible to form the two portions integrally with each other.

The cylindrical portion 5A comprises a generally cylindrical mass of rubber fused about the rigid tubular member 10. The cylindrical portion 5A is preferably formed in its outer surface with a spiral groove 14 which provides allowance for its deformation. The spiral groove 14 provides the cylindrical portion 5A with an uniform elasticity over the peripheral surface thereof.

The flange portion 5B is disposed outwardly of the hole 6, and comprises an annular mass of rubber fused between a pair of annular plates of rigid material 15 and 16 contacting the bracket 3 and the engine 1, respectively. The cylindrical portion 5A includes a cylindrical boss 17 axially projecting from one end thereof into the flange portion 5B. The boss 17 surrounds the rigid tubular member 10, and is engaged with the inner periphery of the outer annular plate 15, while the outer surface of the boss 17 is spaced apart from the inner peripheral surfaces of the inner plate 16 and the rubber so that there may be defined a spacing $d_3$ which provides allowance for compression and deformation of the flange portion 5B.

The flange 11 is preferably spaced apart from the bottom 6a of the hole 6 as shown at $d_4$ to such an extent that the flange 11 may allow for some transverse vibration of the engine 1, but restrict any further vibration thereof to prevent any excessive compression and deformation of the rubber in the flange portion 5B.

According to this invention, the flange and the stops thereby defined prevent any substantial displacement of the engine even if the driving chain has created any counteraction on the engine. The device of this invention, thus, prevents any excessive compression or deformation of the anti-vibratory rubber members, and sagging of the driving chain. As the stops extend horizontally, they do not have any appreciable effect on the anti-vibratory performance of the rubber members, since the vibration of the engine occurs mainly vertically.

As the rubber is not excessively compressed or deformed, it is possible to use softer and more elastic rubber which provides improved anti-vibratory results, depending on the vibration characteristics of the engine.

What is claimed is:

1. A device for preventing displacement of an engine in a motorcycle which includes an engine, a body frame, a driving chain transmitting an output of said engine to a rear wheel, and a plurality of brackets fixed to said body frame for mounting said engine thereon by a plurality of mounting bolts, said mounting bolts being supported by said brackets and extending along a transverse direction of said motorcycle, and said engine being formed with holes to allow extension of said mounting bolts, comprising;
   (a) a pair of rigid tubular members fitted about each of said mounting bolts, a member of said pair positioned adjacent to each end of said bolts, said tubular members having one end provided with a flange which defines a pair of stops abuttable on an inner peripheral surface of said holes, and
   (b) a generally cylindrical anti-vibratory rubber member encircling each of said tubular members and secured thereto.

2. The device of claim 1, wherein said rubber member comprises a generally cylindrical portion formed over each of said tubular member and disposed in said hole, and an annular flange portion disposed outwardly of said hole, said cylindrical portion having one end contacting said flange of each of said tubular member and having an outer surface contacting said inner surface of said hole, and further including a cylindrical boss projecting from the other end of said cylindrical portion into said annular flange portion.

3. The device of claim 2, wherein said annular flange portion comprises a pair of annular plates of rigid material, and an annular mass of rubber disposed between said annular plates, one of said annular plates contacting said bracket attached to said frame and the other annular plate contacting said engine.

4. The device of claim 3, wherein said boss is secured to said one annular plate but spaced apart from said other annular plate and said annular mass of rubber.

5. The device of claim 4, wherein said stops extend along travel direction of said motorcycle and are spaced apart from said inner peripheral surface of said hole by a smaller distance than the vertical distance defined between said flange of said tubular members and said peripheral surface of said hole.

6. The device of claim 5, wherein said flange is oval shape, and said stops are crescent shape.

7. The device of claim 5, wherein said flange is generally circular, and said stops project from said flange diametrically opposite to each other and having substantially rectangular shape.

8. The device of claim 5, wherein said flange is partially circular, and said stops are arcuately shaped.

* * * * *